US011047612B2

(12) United States Patent
Kim et al.

(10) Patent No.: US 11,047,612 B2
(45) Date of Patent: *Jun. 29, 2021

(54) BUILT-IN REFRIGERATOR INCLUDING WIRE COVER UNIT

(71) Applicant: Samsung Electronics Co., Ltd, Suwon-si (KR)

(72) Inventors: Min-kyu Kim, Seoul (KR); In-yong Hwang, Hwaseong-si (KR); Joong-ho Kim, Gwangju (KR); Jong-kyoung Bok, Suwon-si (KR); Yong-man Seo, Hwaseong-si (KR); Ho-june Jeon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/744,978

(22) Filed: Jan. 16, 2020

(65) Prior Publication Data

US 2020/0149800 A1 May 14, 2020

Related U.S. Application Data

(63) Continuation of application No. 15/861,591, filed on Jan. 3, 2018, now Pat. No. 10,563,904.

(30) Foreign Application Priority Data

Jan. 3, 2017 (KR) ........................ 10-2017-0000907

(51) Int. Cl.

*F25D 23/02* (2006.01)
*E05D 11/00* (2006.01)
(Continued)

(52) U.S. Cl.

CPC ........ *F25D 23/028* (2013.01); *E05D 11/0054* (2013.01); *E05D 11/0081* (2013.01);
(Continued)

(58) Field of Classification Search

CPC .. F25D 23/028; F25D 23/02; F25D 2323/024; F25D 2400/40; E05Y 2800/122;
(Continued)

(56) References Cited

U.S. PATENT DOCUMENTS 3,788,094 A 1/1974 Benasutti et al.
3,792,189 A 2/1974 Stengel et al.
(Continued)

FOREIGN PATENT DOCUMENTS

CN 204118531 U 1/2015
CN 104466826 A 3/2015
(Continued)

OTHER PUBLICATIONS

CN 204316032; Fan etal; abstract and figures (Year: 2015).*
(Continued)

*Primary Examiner* — Janet M Wilkens

(57) ABSTRACT

A built-in refrigerator which includes a body; a door configured to open and close an inside of the body; a hinge configured to connect the body with the door; and a wire cover unit configured to guide a wire drawn from the body while a portion thereof slides according to an opening and closing of the door.

20 Claims, 7 Drawing Sheets

(51) Int. Cl.
*F25D 11/00* (2006.01)
*E05D 3/16* (2006.01)

(52) U.S. Cl.
CPC .............. *F25D 11/00* (2013.01); *F25D 23/02* (2013.01); *E05D 3/16* (2013.01); *E05Y 2800/122* (2013.01); *E05Y 2800/40* (2013.01); *E05Y 2900/302* (2013.01); *E05Y 2900/31* (2013.01); *F25D 2323/024* (2013.01); *F25D 2400/40* (2013.01)

(58) Field of Classification Search
CPC ........... E05Y 2800/40; E05Y 2900/302; E05Y 2900/31; E05D 3/16; E05D 11/0054; E05D 11/0081; E05D 11/00; Y10T 16/522; Y10T 16/533; Y10T 16/557
USPC ................. 49/360; 312/405, 405.1, 326–328
See application file for complete search history.

(56) References Cited

U.S. PATENT DOCUMENTS

| | | | | |
|---|---|---|---|---|
| 5,263,509 | A | 11/1993 | Cherry et al. | |
| 5,787,724 | A | 8/1998 | Pohl et al. | |
| 5,941,619 | A | 8/1999 | Stieben et al. | |
| 9,328,954 | B2 | 5/2016 | Kang et al. | |
| 2003/0090182 | A1 * | 5/2003 | Johnson | G06F 1/181 312/265.5 |
| 2006/0017361 | A1 | 1/2006 | Rendel et al. | |
| 2009/0289536 | A1 | 11/2009 | Park et al. | |
| 2011/0181163 | A1 | 7/2011 | Han et al. | |
| 2012/0080991 | A1 | 4/2012 | Wilson | |
| 2012/0242207 | A1 | 9/2012 | Mershon et al. | |
| 2013/0092802 | A1 | 4/2013 | Doberstein | |
| 2013/0212835 | A1 | 8/2013 | Lanzani | |
| 2014/0210328 | A1 | 7/2014 | Akalan et al. | |
| 2014/0319990 | A1 | 10/2014 | Gephart et al. | |
| 2016/0091243 | A1 | 3/2016 | Beier | |
| 2016/0123055 | A1 * | 5/2016 | Ueyama | H04B 7/24 312/405 |
| 2016/0195325 | A1 | 7/2016 | Kim et al. | |
| 2016/0201975 | A1 | 7/2016 | Bazzucchi | |
| 2016/0287231 | A1 | 10/2016 | Terwey | |
| 2018/0149408 | A1 | 5/2018 | Akca et al. | |
| 2018/0156519 | A1 * | 6/2018 | Gueler | F04D 29/4226 |
| 2020/0208450 | A1 * | 7/2020 | Ferreira | E05D 11/0081 |

FOREIGN PATENT DOCUMENTS

| | | | | |
|---|---|---|---|---|
| DE | 69323392 | T2 | | 9/1999 |
| DE | 202008006133 | U1 | | 5/2008 |
| EP | 3396282 | | * | 10/2018 |
| JP | H02-146490 | A | | 6/1990 |
| KR | 20-0136613 | B1 | | 11/1998 |
| KR | 20013661300 | Y1 | | 11/1998 |
| KR | 1020060062664 | A | | 6/2006 |
| KR | 1006067310000 | B1 | | 7/2006 |
| KR | 20080094353 | A | | 10/2008 |
| KR | 20080103139 | | * | 11/2008 |
| WO | 2014/154252 | A1 | | 10/2014 |

OTHER PUBLICATIONS

Communication from a foreign patent office in a counterpart foreign application, European Patent Office, "European Search Report," Application No. EP 17210033.1, dated May 14, 2018, 8 pages.
Office Action dated Oct. 11, 2019 in connection with Chinese Patent Application No. 201810004685.5, 20 pages.
Communication pursuant to Article 94(3) EPC in connection with European Patent Application No. 17 210 033.1, 6 pages.
The Second Office Action in connection with Chinese Application No. 201810004685.5 dated Aug. 13, 2020, 19 pages.
Notice of Preliminary Rejection in connection with Korean Application No. 10-2017-0000907 dated Sep. 28, 2020, 9 pages.
Office Action dated Jan. 29, 2021 in connection with Chinese Patent Application No. 201810004685.5, 22 pages.

* cited by examiner

BUILT-IN REFRIGERATOR INCLUDING WIRE COVER UNIT

CROSS-REFERENCE TO RELATED APPLICATIONS

The present application is a continuation of U.S. patent application Ser. No. 15/861,591 filed on Jan. 3, 2018, which is related to and claims priority to Korean Patent Application No. 10-2017-0000907 filed on Jan. 3, 2017, the disclosures of which are herein incorporated by reference in their entirety.

TECHNICAL FIELD

Apparatuses consistent with the present disclosure relate to a built-in refrigerator, and more particularly, to a built-in refrigerator including a wire cover unit of which a portion is configured to move in a sliding manner to reduce friction of a wire due to an opening and closing of a door.

BACKGROUND

In some refrigerators, wires may be drawn from the body of the refrigerator and connected to the inside of a door to supply power to electronic devices such as a display device, a control panel, and the like of the door and transmit and receive signals to and from the electronic devices.

Since certain refrigerators provide an opening and closing function of the door by a hinge motion, a through hole is formed in the central portion of a rotary shaft and the wire is drawn from the through hole to supply the power to the door.

In certain refrigerators, however, when the door is opened and closed by using a multi-joint hinge, the door is moved simultaneously with linear motion and a rotary motion. Thereby, as the door is opened and closed, the wire can be pulled otherwise introduce friction with surrounding structures at exposed portions of the wire.

As a result, there the wire could be damaged and the sheath of the wire peeled off, and a core of the wire was exposed to the outside, which causes a risk of electric shock accident, and there was a problem in that an appearance was not good.

SUMMARY

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

To address the above-discussed deficiencies, it is a primary object to provide a built-in refrigerator including a wire cover unit capable of minimizing a damage of a wire by reducing a friction occurring at the wire.

According to certain embodiments of the present disclosure, a built-in refrigerator includes a body; a door configured to open and close an inside of the body; a hinge configured to connect the body with the door; and a wire cover unit configured to guide a wire drawn from the body while a portion thereof slides according to an opening and closing of the door.

The wire cover unit may include a case configured to store the wire drawn from the body; a sliding member configured to slide from an inside of the case to be drawn to an outside of the case, and to enclose the wire; and a fixing bracket configured to be hinge-connected to the sliding member and coupled to the door.

The hinge may be a multi joint hinge, and the fixing bracket may be connected to the door through a portion which is adjacent to the door of the multi-joint hinge.

The fixing bracket may include a wire guide that guides the wire drawn from the sliding member to a wire connection terminal which is adjacent to the door.

The wire guide may include a pair of protruding pieces configured to be disposed to face each other; and at least two or more fixing protrusions configured to fix the wire disposed between the pair of protruding pieces.

The case may include a storing portion configured to store the wire; and a drawing portion configured to guide the sliding member to be drawn.

The storing portion may include a wire fixing portion limiting a movement length of the wire.

The wire fixing portion may include a protruding member protruding on an inner surface of the storing portion.

A plurality of protruding members may be provided, and the wire may be disposed above and below the plurality of protruding members in a zigzag shape.

The sliding member may be formed of a soft material.

One end of the wire cover unit may be hooked to a top surface of the body, and a portion of a side surface of the wire cover unit may be screwed to the body.

The body may include a coupling hole positioned in the top surface, and one end of the wire cover unit may include an inserting protrusion corresponding to a shape of the coupling hole, and the inserting protrusion and the coupling hole may be hooked to each other.

The body may be screwed to the wire cover unit in an outward direction from a center of the body.

The body may include a body screw groove protruding from the body, the wire cover unit may include a cover screw groove in a side surface of the wire cover unit corresponding to the body screw groove, and a screw may be fastened to the body screw groove and the cover screw groove.

The wire cover unit may include a plurality of protruding portions which are linearly in contact with a portion which is in contact with the wire in a length direction of the wire.

According to another aspect of the present disclosure, a built-in refrigerator includes a body; a door configured to open and close an inside of the body; a multi joint hinge configured to connect the body with the door; a case configured to store the wire drawn from the body; and a sliding member configured to slide from an inside of the case to be drawn to an outside of the case, and to enclose the wire which is hinge-coupled to the door.

The storing portion may include a plurality of protruding portions which can be linearly in contact with a portion which is in contact lengthwise with the wire.

One end of the case may be hooked to a top surface of the body, and a portion of a side surface of the case may be screwed to the body.

The body and the case may be screwed to each other in an outward direction of the body from the center of the body.

Before undertaking the DETAILED DESCRIPTION below, it may be advantageous to set forth definitions of certain words and phrases used throughout this patent document: the terms “include” and “comprise,” as well as derivatives thereof, mean inclusion without limitation; the term “or,” is inclusive, meaning and/or; the phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWING

For a more complete understanding of the present disclosure and its advantages, reference is now made to the following description taken in conjunction with the accompanying drawings, in which like reference numerals represent like parts.

DETAILED DESCRIPTION

Figure 1:
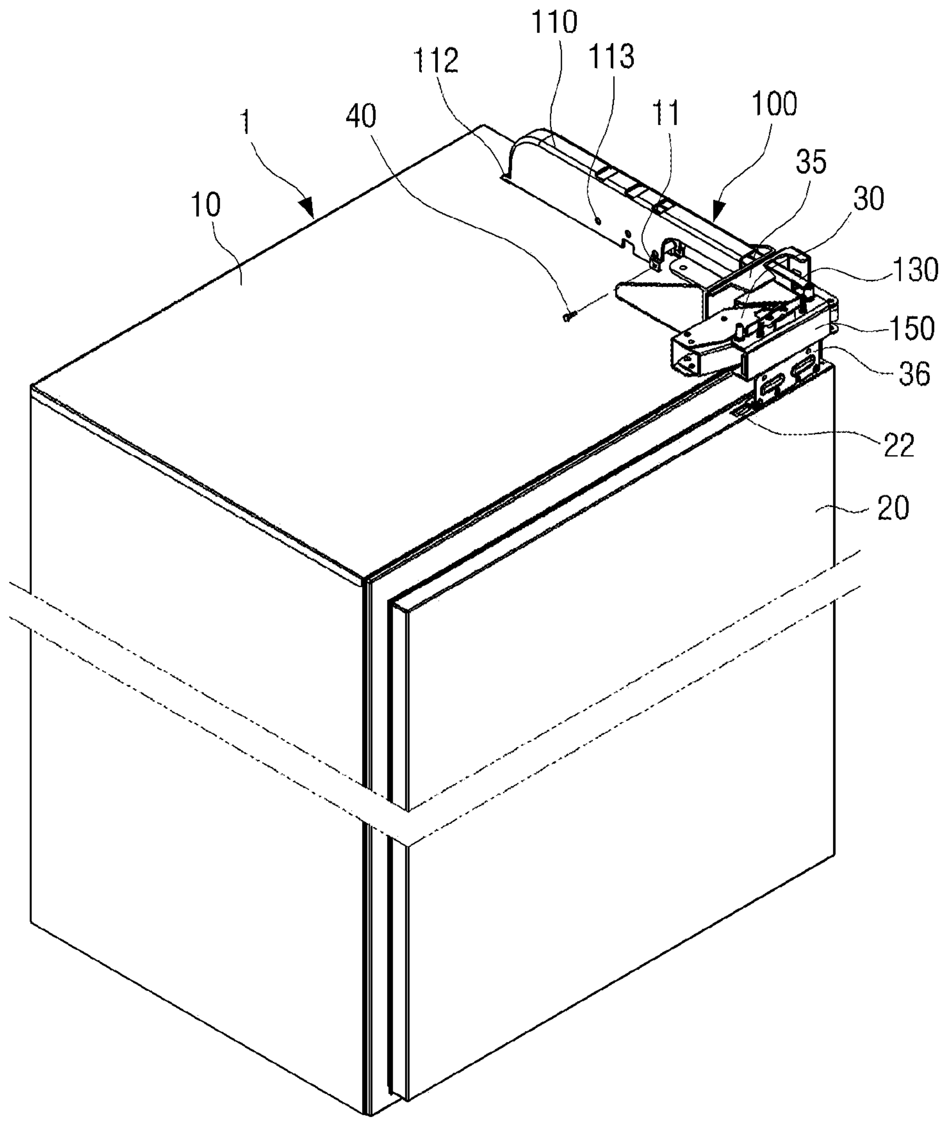
FIG. 1 illustrates a perspective view of a built-in refrigerator including a wire cover unit according to certain embodiments of the present disclosure.

FIGS. 1A through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, diverse exemplary embodiments of the present disclosure will be described with reference to the accompanying drawings. However, it is to be understood that technologies mentioned in the present disclosure are not limited to specific exemplary embodiments, but include all modifications, equivalents, and substitutions according to exemplary embodiments of the present disclosure. Throughout the accompanying drawings, similar components will be denoted by similar reference numerals.

Terms used in the present disclosure may be used only in order to describe specific exemplary embodiments rather than restricting the scope of other exemplary embodiments. Singular forms may include plural forms unless the context clearly indicates otherwise. Terms used in the present specification including technical and scientific terms have the same meanings as those that are generally understood by those skilled in the art to which the present disclosure pertains. Terms defined by a general dictionary among terms used in the present disclosure may be interpreted as meaning that are the same as or similar to meanings within a context of the related art, and are not interpreted as ideal or excessively formal meaning unless clearly defined in the present disclosure. In some cases, terms may not be interpreted to exclude exemplary embodiments of the present disclosure even though they are defined in the present disclosure.

Hereinafter, a configuration of a built-in refrigerator according to certain embodiments of the present disclosure will be described with reference to the accompanying drawings.

Figure 2:
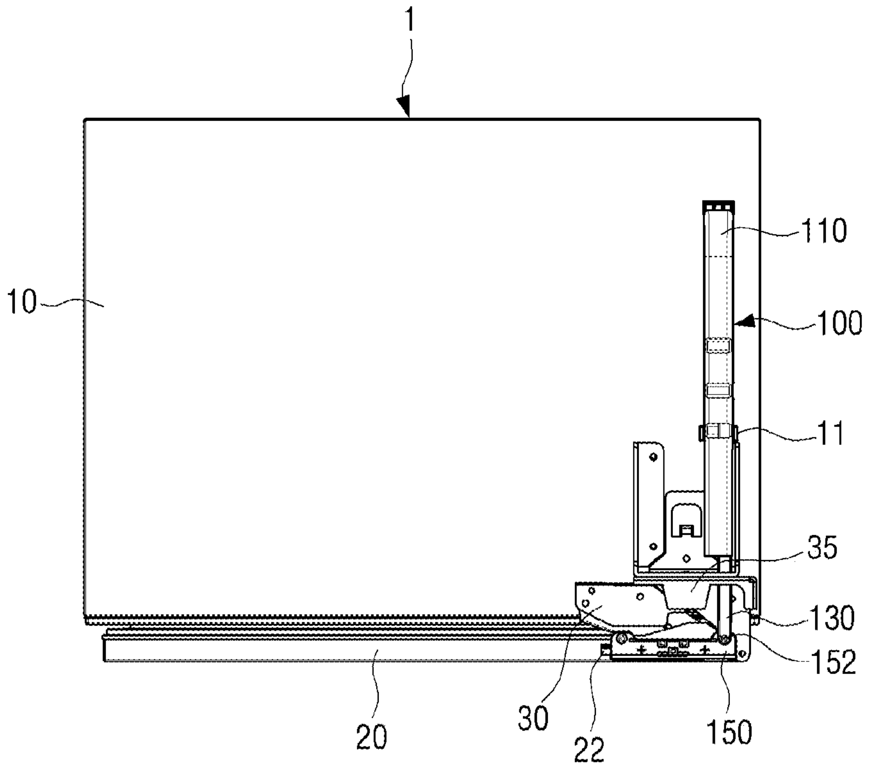
FIG. 2 illustrates a plan view of a door of a built-in refrigerator in a closed state, according to certain embodiments of the present disclosure.
Figure 3:
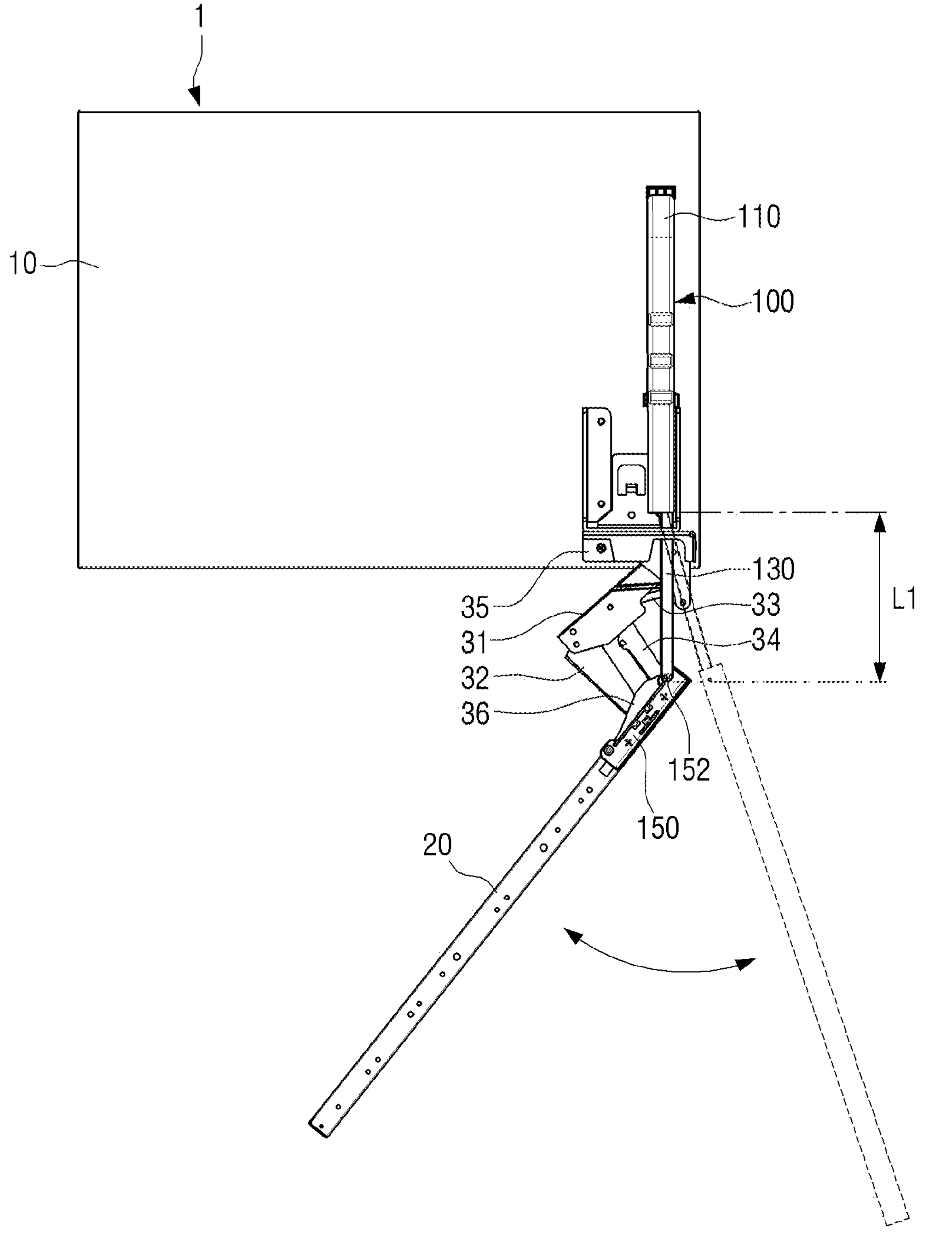
FIG. 3 is a plan view illustrating a state in which the door of the built-in refrigerator including a wire cover unit according to an exemplary embodiment of the present disclosure is opened.

FIG. 1 illustrates a perspective view of a built-in refrigerator including a wire cover unit according to at least one exemplary embodiment of the present disclosure, FIG. 2 illustrates a plan view of a door of a built-in refrigerator 1 including a wire cover unit according to an exemplary embodiment of the present disclosure in a closed state, and FIG. 3 illustrates a plan view of a door of a built-in refrigerator including a wire cover unit according to certain embodiments of the present disclosure, in an opened state.

Referring to FIG. 1, a built-in refrigerator 1 according to certain embodiments of the present disclosure includes a body 10, a door 20, a hinge 30, and a wire cover unit 100.

The built-in refrigerator 1 may be installed on a wall surface or in a space provided between the kitchen cabinetry. The body 10 may include an opened one surface and includes storage space therein.

The door 20 is, in some embodiments, connected to one corner of the opened surface of the body 10 by the hinge 30. The door 20 may include electronic devices (not shown) such as a display, a temperature control button, and the like, and a wire passing hole 22. The wire for supplying power to the electronic device or transmitting and receiving signals to and from the electronic device supplies the power or transmits and receives the signals to and from the electronic device through the wire passing hole 22.

The hinge 30 may be a multi joint hinge. According to certain embodiments, body frame 35 and a door frame 36 of the hinge 30 are coupled to the body 10 and the door 20, respectively. Since the built-in refrigerator 1 can be arranged on the wall surface or in the space between the kitchen cabinetry, a side surface of the built-in refrigerator 1 may have almost no free space. Therefore, when a rotary door hinge performing only a rotary motion is used, an outer portion of the door may strike or impinge upon the kitchen cabinetry or the wall surface.

In order to solve the above-mentioned problem, it may be preferable that the hinge 30 connecting the body 10 and the door 20 of the built-in refrigerator 1 be a multi joint hinge.

The multi-joint may simultaneously perform a forward motion and a rotary motion. That is, when the door 20 is opened, the door 20 may move to a front of the body 10 and perform the rotary motion at the same time. Since the door 20 is operated to be opened while moving to the front of the body 10, the outer portion of the door 20 may avoid the striking or otherwise impinging upon the kitchen cabinetry or the wall surface.

According to certain embodiments, the wire cover unit 100 includes a case 110, a sliding member 130, and a fixing bracket 150.

The case 110 can include a space in which the wire drawn from the body 10 is positioned and is coupled to a top surface of the body 10. In order to couple the case 110 to the top surface of the body 10 without using separate equipment, one end of the case 110 may be hooked to the top surface of the body 10. A coupling groove 15 of the top surface of the body 10 and an inserting protrusion 112 of a rear surface portion of the case are hooked to each other to fix one end of the case 110 to the top surface of the body 10.

According to certain embodiments of the present disclosure, the top surface of the body 10 and a side surface of the case 110 are connected to each other by one or more screws. It may be undesirable and/or difficult for the built-in refrigerator 1 to incorporate a screw which fastens to the case 110 from a side which is adjacent to the wall surface. The reason is because depending on the overall profile of built-in refrigerator and the installation site, the gap between the side surface of the case 110 and a wall surface may be very narrow. Therefore, a screw 40 may fastened to a body screw groove 11 in a direction from the center of the body 10 toward the wall surface.

A portion of the wire drawn from the top surface of the body 10 and positioned in the case 110 may be enclosed by a sliding member 130. The sliding member 130 can include a space in which the wire is mounted.

According to certain embodiments, the sliding member 130 is connected to the fixing bracket 150 by a rotatable hinge 152 (see FIG. 2) at one end thereof and includes an opening 131 (see FIG. 4) so that the wire is drawn in a door direction. The wire drawn from the body 10 may be led into the other end of the sliding member 130 by the sliding member 130.

According to some embodiments, the sliding member 130 is coupled to the door 20 or coupled to the fixing bracket 150 attached to the door 20 through the hinge 152. If there is no hinge 152 when the door 20 is opened from the body 10 and is rotated, the sliding member may be bent. In such cases, stress may be repeatedly applied to the sliding member 130 from the opening and closing of door 20, and the sliding member 130 may be subject to fatigue failure. Thus, according to certain embodiments, one end of the sliding member 130 may hingeably coupled to the door 20 or the fixing bracket 150 to be rotatable. Further, since the sliding member 130 may be bent when the door 20 is fully opened, an ABS (acrylonitrile-butadiene-styrene) resin or similarly flexible material may be used.

The length of the sliding member 130 may be determined depending on an advancing distance of the door 20. That is, according to some embodiments, the length of the sliding member 130 is determined to be longer than the advancing distance of the door 20 so that the wire is not exposed to the outside of the case 110.

The fixing bracket 150 may be coupled to the door frame 36 of the multi joint and is connected to the door 20. The fixing bracket 150 is hingeably connected to the sliding member 130. Therefore, when the door 20 of the built-in refrigerator is opened, the sliding member 130 may move in conjunction with a forward motion of the door 20. According to certain embodiments, the fixing bracket 150 includes a wire guide that guides the wire drawn from the opening 131 of the sliding member 130 to a wire connection terminal 172 which is adjacent to the door or the wire passing hole 22 of the door 20.

The wire may minimize its motion through the wire guide. Such a wire guide guides the wire to the wire passing hole 22 of the door 20 or the wire connection terminal 172 which is adjacent to the door 20.

According to some embodiments, the wire cover unit 100 includes the fixing bracket 150. According to other embodiments, the fixing bracket 150 may be omitted. In a case in which the fixing bracket 150 is omitted, the sliding member 130 may be hingeably connected to the door frame 36 or may be hingeably connected to the door 20, and the wire passing hole 22 may be formed to be adjacent to the hinge.

A structure of the multi joint hinge according to certain embodiments of this disclosure will be now described and an opening and closing operation of the door 20 of the built-in refrigerator will be then described with reference to FIGS. 2 and 3.

According to certain embodiments, the multi joint hinge 30 includes a plurality of links 31, 32, 33 and 34. Referring to FIG. 3, the multi joint hinge 30 includes a main body link 31, a main door link 32, a sub body link 33, and a sub door link 34. Further, the multi joint hinge 30 further includes a body frame 35 attached to the body 10 and a door fixing frame 36 attached to the door 20.

One end of the main body link 31 of the multi joint hinge 30 is hingeably connected to the body frame 35 and the other end of the main body link 31 is connected to one end of the main door link 32. The other end of the main door link 32 is hingeably connected to the door frame 36. Although it is described in the drawing of the present disclosure that the other end of the main door link 32 is hingeably connected to the door frame 36, the other end of the main door link 32 may be configured to slide on the door frame 36.

According to certain embodiments, the multi joint hinge may include only the main body link 31 and the main door link 32 and can present a problem that the opening and closing path of the door varies. According to some embodiments, the opening and closing path can be limited by attaching the sub body link 33 and the sub door link 34. One end of the sub body link 33 is coupled to the body frame 35 of the body 10 and the other end of the sub body link 33 hingeably connected to the central portion of the sub door link 34. One end of the sub door link 34 may be hingeably connected to the central portion of the main body link 31 to limit a path of the main body link 31. The other end of the sub door link 34 is hingeably coupled to the door frame 36.

As described above, according to some embodiments of the present disclosure, the main body link 31, the main door link 32, the sub body link 33, and the sub door link 34 of the multi joint hinge 30 can be organically coupled to each other to allow simultaneous forward and rotational movement along defined path(s). With the organic coupling between the respective links, the multi joint hinge 30 may move the door 20 forward and rotate the door 20 at the same time while limiting a movement direction of the door 20 to one. By the multi joint hinge 30, it is possible for the door 20 to avoid interference with the wall surface or the furniture closet when the door 20 is opened.

Referring to the illustration of certain exemplary embodiments provided by FIG. 2, when the door 20 closes the inside of the body 10, the multi joint hinge 30 is contracted with each other, and the door 20 and an opened one surface of the body 10 face each other. According to certain embodiments, in the case in which the door 20 is closed, an exposed length of the sliding member 130 may at its shortest. In this case, most of the sliding member 130 remains in the case 110.

Referring to FIG. 3, according to some embodiments, when the door 20 is opened, the links of the multi joint hinge 30 are relaxed and the door 20 simultaneously performs the forward and rotary motions. Therefore, the distance between the hinge 152 of one end of the sliding member 130 and a portion from which the sliding member 130 of the case 110 is drawn is increased. That is, the sliding member 130 slides from the case 110 and is drawn to the outside. Since the advancing distance, a rotary direction, and a movement direction of the door 20 are limited by the multi joint hinge 30, the distance of the sliding member 130 drawn from the case 110 is also limited. Since, according to certain embodiments, the length of the sliding member 130 is determined to be larger than a distance at which the sliding member 130 is maximally drawn, the entirety of the sliding member 130 need not be drawn to the outside of the case 110.

In FIG. 3, a portion indicated by a dotted line illustrates a case in which the door 20 is opened by 90° or more based on the opened surface of the body 10. In this case, the sliding member 130 may be bent, and the sliding member 130 may be formed of a soft material such as ABS, a rubber, or the like to prevent the sliding member 130 from being damaged due to the bending.

Figure 4:
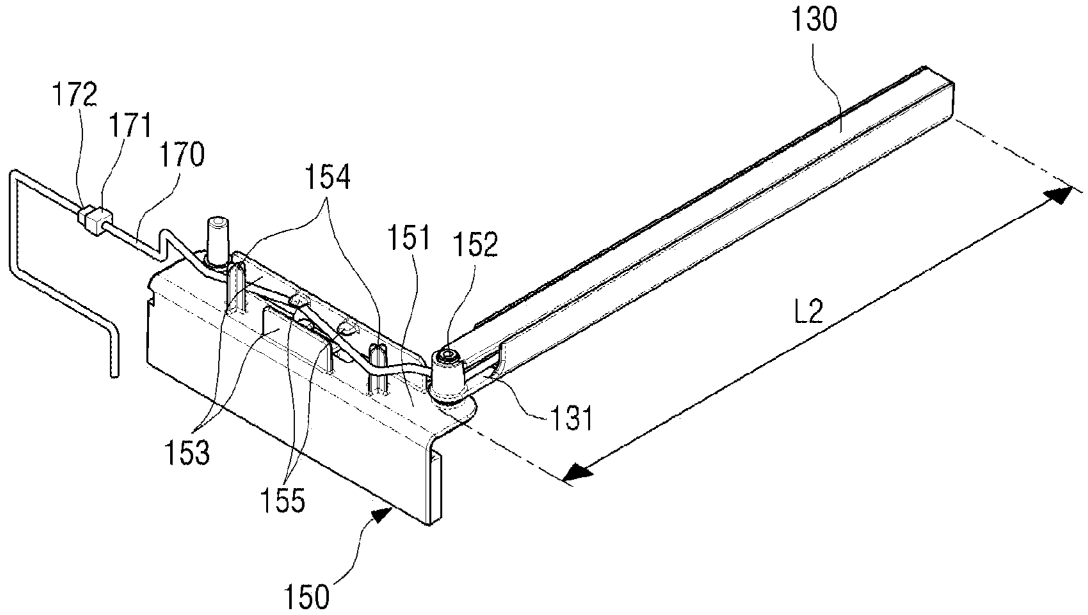
FIG. 4 illustrates a perspective view of a wire cover unit according to certain embodiments of the present disclosure.

FIG. 4 is a perspective view illustrating a wire cover unit 100 according to an exemplary embodiment of the present disclosure.

Referring to FIG. 4, according to certain embodiments, one end of the sliding member 130 is hingeably connected to the fixing bracket 150. The opening 131 may be formed in a side surface of the sliding member at one end of the sliding member 130 and the wire 170 is drawn from the opening 131 of the sliding member 130.

In some embodiments, fixing bracket 150 includes a wire guide 151, and the wire guide 151 guides the wire drawn from the opening 131 to the wire connection terminal 172 which is adjacent to the door 20 or the wire passing hole 22 (see FIG. 1) included in the door. A wire connection terminal 171 which is adjacent to the sliding member 130 and is connectable to the wire connection terminal 172 which is adjacent to the door 20 may be included. The wire connection terminals 171 and 172 may be harness connectors.

The wire guide 151 may include a pair of protruding pieces 153 and two or more fixing protrusions 154.

The pair of protruding pieces 153 is disposed on the fixing bracket 150 to face each other. In this case, the wire may be disposed between the pair of protruding pieces 153. At least two or more fixing protrusions 155 fixing the wire 170 disposed between the pair of protruding pieces 153 may be further disposed on the fixing bracket 150.

The wire 170 drawn from the opening 131 of the sliding member 130 is guided to the wire connection terminal 172 which is adjacent to the door 20 or the wire passing hole 22 by the pair of protruding pieces 153. In this case, since the wire 170 may be moved when the door 20 is opened and closed, a fixing member for fixing the wire 170 is required. According to certain embodiments the present disclosure, as the fixing member for fixing the wire, the fixing protrusions 154 may be used. A plurality of fixing protrusions 154 are disposed on the fixing bracket 150 and the wire 170 is disposed in a zigzag shape so as to be caught by the plurality of fixing protrusions 154, thereby limiting a motion of the wire 170 in a planar direction.

According to certain embodiments as disclosed herein, wire guide 151 may have auxiliary protrusions 155 protruding from the protruding pieces 153. The auxiliary protrusions 155 may limit vertical motion of the wire 170. As described above, the wire guide 151 may have a plurality of protruding pieces 153, the fixing protrusions 154, and the like to fix the wire 170 to a top surface of the fixing bracket 150. The fixing member for fixing is not limited to the protruding pieces 153, the fixing protrusion 154, the auxiliary protrusion 155, or the like, and may include a hook capable of fitting the wire 170, a through-type member attached to the fixing bracket 150 and enclosing the wire, and the like.

According to certain embodiments of the present disclosure, a length L2 of the sliding member 130 may be determined in consideration of an installation position of the case and the advancing distance of the door 20. According to certain embodiments, it is desirable that length L2 of the sliding member 130 be determined to have a margin in which the wire 170 may move so that the wire 170 is not bent inside the case 110 at a position at which the sliding member 130 is retracted, such as when the door 20 is closed. Further, according to some embodiments, the length of the sliding member is determined to be longer than the maximum advancing distance L1 (see FIG. 3) of the door 20 so that a portion of the sliding member 130 is disposed to be within the drawn portion of the case 110 even at the maximum advancing distance of the door 20, when the door 20 is opened.

Figure 5A:
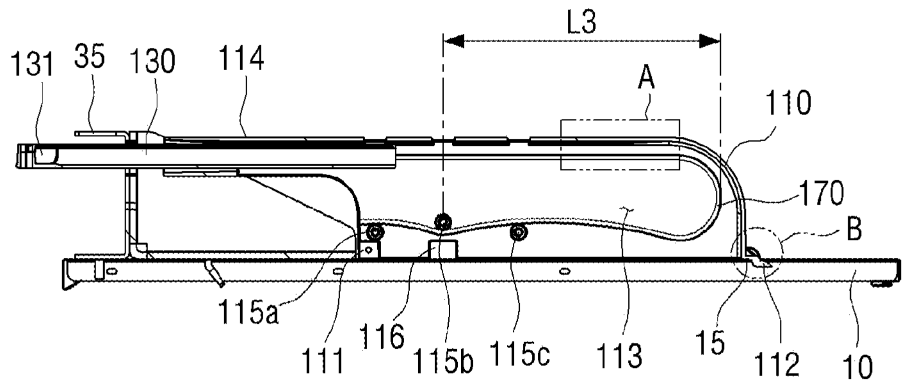
FIGS. 5A and 5B illustrate cross-sectional views of a wire cover unit and an upper portion of a body of the built-in refrigerator according to certain embodiments of the present disclosure.
Figure 5B:
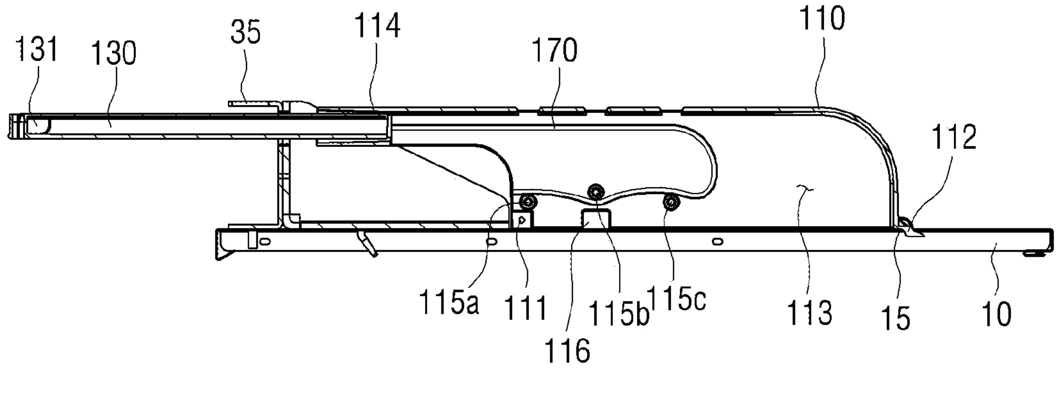
Figure 6:
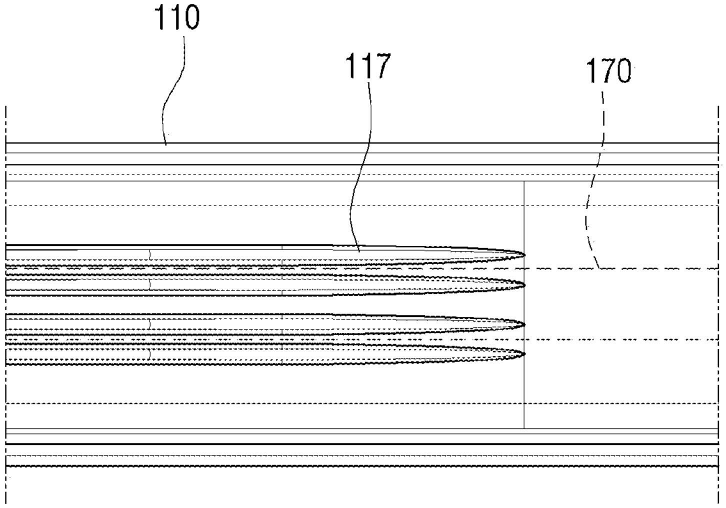
FIG. 6 further illustrates, through a bottom view, part A shown in FIG. 5A.
Figure 7:
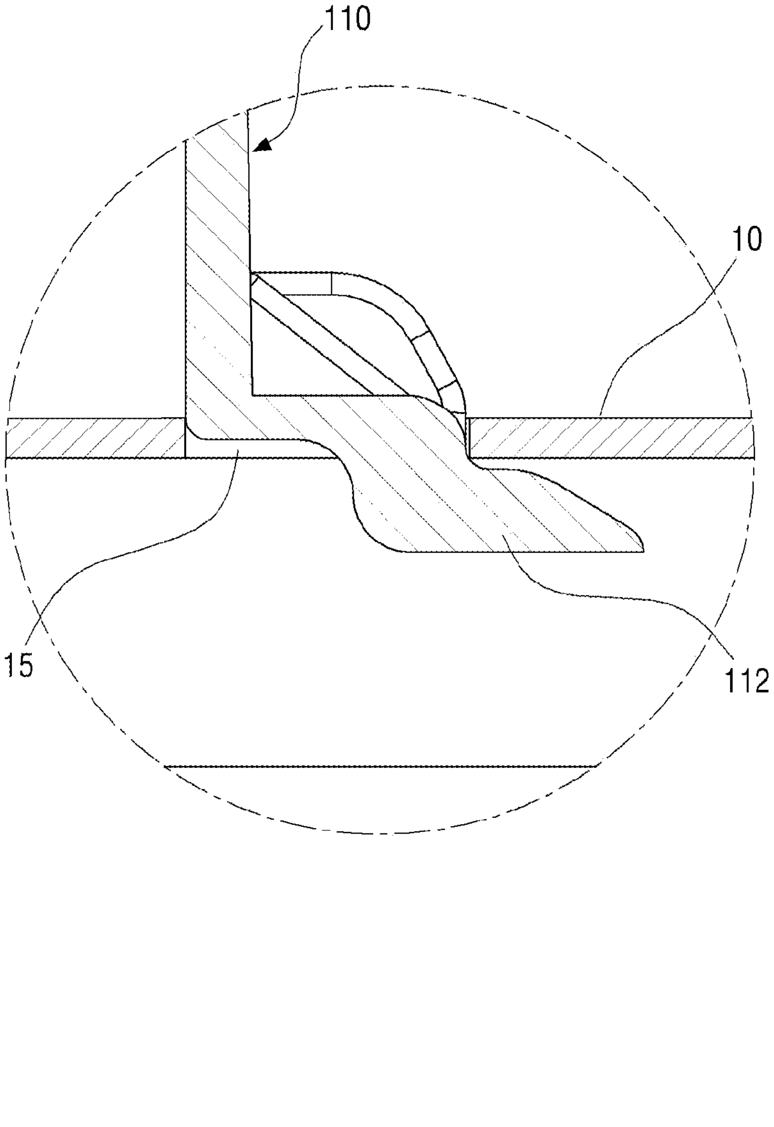
FIG. 7 further illustrates, through an enlarged cross-sectional view, part B shown in FIG. 5A.

FIGS. 5A and 5B illustrate cross-sectional views of an upper portion of the wire cover unit 100 and the body 10 of the built-in refrigerator 1 according to certain exemplary embodiments of the present disclosure, FIG. 6 further illustrates, from a bottom view, part A of FIG. 5A, and FIG. 7 further illustrates, from an enlarged view, part B of FIG. 5A.

Referring to FIGS. 5A and 5B, in some embodiments, the case 110 of the wire cover unit 110 and the top surface of the body 10 are coupled to each other. FIG. 5A illustrates an arrangement of the sliding member 130 and the wire 170 in a state in which the door 20 is closed and FIG. 5B illustrates an arrangement of the sliding member 130 and the wire 170 in a state in which the door 20 is opened.

According to certain embodiments of the present disclosure, case 110 includes a storing portion 113 and a drawing portion 114. The case 110 may store the wire 170 to prevent the wire 170 from being exposed to the outside, and the drawing portion 114 has a shape corresponding to the sliding member 130 so that the sliding member 130 slides to draw the wire 170.

In some embodiments, storing portion 113 stores the wire 170 drawn from the top surface of the body 10. The storing portion 113 determines a movement position of the wire 170 and includes a wire fixing portion limiting a moving length of the wire 170. The moving length of the wire 170 is limited by installing the wire fixing portion and this is to prevent the wire 170 from being entangled in the storing portion 113. The wire fixing portion includes protruding members 115*a*, 115*b*, and 115*c* protruding on an inner surface of the storing portion 113. The protruding members 115*a*, 115*b*, and 115*c* may be plural, and the wire fixing portion may include a wire fixing protrusion 116 protruding below a position corresponding to one of the protruding members 115*a*, 115*b*, and 115*c*. The wire fixing portion may have surfaces of the protruding members 115*a*, 115*b*, and 115*c* that are in contact with the wire, which are curved surfaces, to minimize friction with the wire. That is, the protruding members 115*a*, 115*b*, and 115*c* of the wire fixing portion may be formed in a cylindrical shape. Further, the protruding members 115*a*, 115*b*, and 115*c* of the wire fixing portion may include a roller (not shown) to minimize the friction even in a case in which the motion of the wire 170 occurs in the case 110.

According to some embodiments, wire 170 may be disposed in a zigzag shape above and below the plurality of protruding members 115*a*, 115*b*, and 115*c*. First to third protruding members 115*a*, 115*b*, and 115*c* may be sequentially disposed from a front surface. The wire 170 drawn from the top surface of the body 10 is disposed at upper ends of the first protruding member and third protruding member 115*a* and 115*c*, and may be disposed at a lower end of the second protruding member 115*b*. According to some embodiments wire 170 is drawn to the outside of the case 110, since the wire 170 may be caught by the second protruding member 115*b*, it is possible to prevent the wire 170 from being disconnected because the wire 170 is drawn without any limitation and force is applied to the wire 170. Even if the maintenance of the wire 170 is performed, the protruding members 115*a*, 115*b*, and 115*c* may prevent the wire 170 from being drawn by a predetermined distance or more, thereby preventing the wire 170 inside the body 10 from being damaged.

According to some embodiments, the wire fixing portion includes three protruding members 115*a*, 115*b*, and 115*c* as illustrated in FIG. 5A and FIG. 5B, in which case, the maximum drawing distance of the wire 170 is determined by a distance L3 from the second protruding member 115*b* to a position at which the wire is bent when the door 20 is closed. The wire 170 may be drawn approximately twice as longer as the distance L3. Therefore, when the maintenance of the wire 170 is required, in a case in which the wire 170 is separated or is not separated by a connector inside the door 20 or the body 10, the protruding members 115*a*, 115*b*, and 115*c* may be disposed so that the drawing distance of the wire 170 is sufficient, and in a case in which the wire 170 may be separated by the connector at the middle, the protruding members 115*a*, 115*b*, and 115*c* may be disposed by taking into account only the drawing distance of the sliding member 130.

In embodiments, in which the wire 170 and the inside of the case 110 are in contact with each other, in order to minimize the friction between the wire 170 and the case 110, a protruding portion 117 may be provided in a length direction of the case 110 to be linearly in contact with the wire 170 inside the case 110. Referring to FIG. 6, which illustrates, through an enlarged bottom view, part A of FIG. 5A, an upper bottom of the case 110 has a comb shaped protruding portion 117. According to some embodiments, the wire 170 is in contact with the case 110, and the wire 170 is in contact with a tip of the protruding portion 117. Therefore, a contact area is reduced and the friction between the wire 170 and the case 110 is reduced as compared to a case in which the wire 170 is directly in contact with the case 110. Since resistance is small during the movement of the wire 170 due to allowing a direction of the protruding portion 117 of the comb-shape to coincide with a movement direction of the wire 170, it may be possible to prevent the wire from being damaged due to the friction between the wire 170 and the case 110.

FIG. 5B illustrates a coupled portion between the case 110 and top surface of the body 10 according to some embodiments of the present disclosure. Referring to FIG. 7, which illustrates an enlarged view of the coupled portion according to certain embodiments, the top surface of the body 10 has a coupling groove 15 and one end of the case 110 has the inserting protrusion 112 having a shape corresponding to the coupling groove 15. The inserting protrusion 112 of the case is hooked to the coupling groove 15. One end portion of the case 110 is hooked to the coupling groove 15 as described above, and the side surface of the case 110 is screwed to the body as described above. A case screw groove 111 which is on the side surface of the case is illustrated in FIG. 5A and FIG. 5B. The case screw groove 111 is disposed at a position corresponding to the body screw groove 11 protruding on the top surface of the body 10, and the body 10 and the side surface of the case 110 are screwed to the respective screw grooves 11 and 111 externally from the central portion of the body 10.

According to some embodiments, drawing portion 114 is utilized as a passage through which the sliding member 130 is drawn from and led to the outside of the case 110. Even in the case in which the door 20 is closed, the drawing portion 114 may have a sufficient length so that the sliding member 130 is not exposed.

Hereinafter, an operation of the built-in refrigerator 1 according to an exemplary embodiment of the present disclosure will be described with reference to the accompanying drawings.

According to certain embodiments, built-in refrigerator 1 is stored in a cabinetry or is installed in a refrigerator storage space of the wall surface. When a strictly rotary hinge, is used in the built-in refrigerator 1, where door 20 is fully opened, interference between the wall surface or the furniture closet and a movement path of the door 20 occurs, thereby causing a case in which the door 20 is not fully opened.

Accordingly, the door 20 of the built-in refrigerator 1 may be connected to the body 10 by the multi joint hinge 30. Even in the case of the rotary hinge performing only a general rotary motion, there may be movement and exposure of the wire. However, to clearly illustrate features of the wire cover unit 100 of the built-in refrigerator 1 according to certain embodiments of the present disclosure, the operation of the built-in refrigerator 1 the door 20 and the body 10 are connected to each other by the multi joint 30 as illustrated in the drawings.

A state in which the door 20 of the built-in refrigerator 1 is closed will be described with reference to FIGS. 1, 2, 5A and 5B.

According to some embodiments, links 31, 32, 33, and 34 of the multi-link hinge 30 are contracted to each other. The wire 170 drawn from the top surface of the body 10 of the built-in refrigerator 1 is stored in the storing portion 113 of the case 110, and a portion of the stored wire 170 is enclosed by the sliding member 130 that slides on the drawing portion 114 of the case 110. The wire 170 may be drawn through the opening 131 in a door direction of the sliding member 130, and the drawn wire 170 is guided to the wire passing hole 22 of the door 20 along the guidance of the fixing bracket 150. The wire 170 may be connected to an electronic device through the wire passing hole 22, and may supply power to the electronic device such as a display, a light apparatus dial, a lighting of the dial, or the like which is in the door 20, or transmit and receive signals according to an operation of the display or the dial with a controller (not shown).

As illustrated in FIG. 5A, according to some embodiments, when the door 20 is closed, most of the sliding member 130 is positioned inside the case 110. The wire 170 is stored in the storing portion 113 of the case 110, and the protruding members 115*a*, 115*b*, and 115*c* are provided to prevent twisting of the wire 170 or entangling between the wires. Since the protruding members 115*a*, 115*b*, and 115*c* limit the movement length of the wire 170 according to the opening and closing of the door 20 and only the wire 170 of the limited length moves, the protruding members 115*a*, 115*b*, and 115*c* may prevent the twisting or entangling of the wire 170.

A process of opening the door 20 of the built-in refrigerator 1 and a state in which the door 20 of the built-in refrigerator 1 is opened, according to certain embodiments of the present disclosure will be described with reference to FIGS. 1, 3, 5A and 5B.

If the door 20 is opened, the multi joint hinge 30 starts to be relaxed. Since the multi-joint hinge 30 has the respective links 31, 32, 33, and 34 which are connected to each other, the movement path of the door 20 is determined as described above. That is, the door fixing frame 36 of the multi joint hinge 30 has one movement path based on the body frame 35.

According to certain embodiments, door 20 performs an advance movement by the multi joint hinge 30 being relaxed. Since the main door link 32 and the sub door link 34 are hinge-connected to the door fixing frame 36, they involve the rotary movement. Therefore, the door 20 simultaneously performs the advance and rotary movements.

According to some embodiments, when the door 20 advances, the sliding member 130 slides in the door direction from the wire cover unit 100 and is drawn by the advanced distance L1 of the door 20. Since the length of the sliding member 130 is determined by taking account into the movement distance L1 of the door 20, the wire 170 is not exposed between the sliding member 130 and the case 110. Since the wire 170 is not exposed, friction between an external object and the wire 170 may be reduced, and wear and damage of the wire 170 may be reduced.

Further, since the storing portion of the case 110 keeps a sufficient length of wire 170 which may be moved by taking account into the drawn length of the wire 170, force pulling the wire 170 by the opened door 20, that is, tensile force applied to the wire 170 may be minimized. Therefore, a damage risk of the wire 170 may be reduced.

According to certain embodiments, when the wire 170 moves in the case 110, the plurality of protruding members 115*a*, 115*b*, and 115*c* have the curved surface or are configured as the cylindrical roller, thereby reducing the friction between the plurality of protruding members 115*a*, 115*b*, and 115*c* and the wire 170 inside the case 110.

When the door 20 is fully opened, in some embodiments, the door 20 is opened as indicated by the dotted line of FIG. 3. A predominantly opened position of the door 20 is determined according to a movement range of the multi joint hinge 30. When the door 20 is fully opened and an angle between the opened surface of the body 10 and the door 20 is an obtuse angle, the sliding member 130 is bent. If the sliding member 130 is weak in softness, since sliding member 130 may be damaged, it is preferable that the sliding member 130 is formed of a soft material.

Hereinafter, an operation of mounting and separating the wire cover unit 110 on and from the built-in refrigerator 1 according to certain embodiments of the present disclosure will be described.

In some embodiments, the wire cover unit 100 includes the case 110, the sliding member 130, and the fixing bracket 150. The sliding member 130 and the fixing bracket 150 which are hingeably connected to each other are provided.

First, the wire 170 is disposed on the protruding members 115*a*, 115*b*, and 115*c* of the case 110 in the zigzag shape, and the margin taking account into the movement length of the wire 170 is stored in the storing portion 113. A portion of the stored wire 170 is disposed to be exposed to the outside through the drawing portion 114.

Thereafter, in some embodiments, the inserting protrusion 112 of the case 110 is inserted into the coupling groove 15 of the top surface of the body 10 and is hooked thereto. The body screw groove 11 protruding from the body 10 and a corresponding case screw groove 111 are aligned to coincide with each other, and the screw is coupled to the screw grooves 11 and 111 in an outward direction from the center of the body 10.

If the case 110 and the body 10 are fixed, the sliding member 130 can be installed to protect the wire 170 drawn from the case 110.

According to certain embodiments, wire 170 drawn from the case is inserted into the sliding member 130, and the sliding member 130 slides into the case 110 through the drawing portion 114. Thereafter, the fixing bracket 150 which is hingeably connected to the sliding member 130 is coupled to the door frame 36, thereby mounting the wire cover unit 100 in the built-in refrigerator 1. Thereafter, the wire 170 is connected through the wire connection terminal (harness).

An operation of disassembling the wire cover unit 100 may be performed in the reverse order of the mounting operation for maintenance or replacement of the wire 170 provided in the built-in refrigerator 1.

Although the wire cover unit 100 according to an exemplary embodiment of the present disclosure is described as being mounted in the built-in refrigerator 1, the wire cover unit 100 may be mounted in a device such as a built-in microwave oven, a built-in styler, or the like having a door 20 which includes a device requiring power such as a display or including a dial button requiring transmission and reception of signals.

As described above, in some embodiments, the wire cover unit 100 includes the sliding member 130 and the case 110, and the wire 170 may be drawn through the sliding member 130 in conjunction with the movement of the door 20 according to the motion of the multi joint hinge 30. Thereby, the external exposure of the wire 170 may be minimized, the damage risk due to the friction with the external object is reduced, and there is an advantage in that an appearance is good.

Further, since, according to some embodiments, the wire cover unit has the protruding members 115*a*, 115*b*, and 115*c* inside the case 110 and has the protruding portion 117 in the length direction of the case, the friction due to the movement of the wire 170 may be reduced and the damage risk due to the movement of the wire may also be reduced.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A refrigerator comprising:

a body;

a door configured to open and close an inside of the body;

a hinge configured to connect the body with the door; and a wire cover unit configured to guide a wire drawn from the body while a portion thereof slides according to an opening and closing of the door, the wire cover unit including:

a case mounted to a surface of the body and including a wire storing portion defined by a space between the case and the surface of the body to store the wire, the wire storing portion including a wire fixing portion limiting a movement length of the wire, and an insertion end insertably hook-coupled with the body.

2. The refrigerator of claim 1, wherein the wire fixing portion includes a protruding member protruding on an inner surface of the wire storing portion.

3. The refrigerator of claim 2, wherein:

a plurality of protruding members are provided, and the wire is disposed above and below the plurality of protruding members in a zigzag shape.

4. A refrigerator comprising:

a body;

a door configured to open and close an inside of the body;

a hinge configured to connect the body with the door; and a wire cover unit configured to guide a wire drawn from the body while a portion thereof slides according to an opening and closing of the door, the wire cover unit comprising:

a case mounted to a surface of the body and including a wire storing portion defined by a space between the case and a surface of the body that the case to store the wire, a sliding member configured to slide from an inside of the case to be drawn to an outside of the case, and to enclose the wire, and an insertion end insertably hook-coupled with the body.

5. The refrigerator of claim 4, wherein the wire cover unit further includes:

a fixing bracket configured to be hingeably connected to the sliding member and coupled to the door.

6. The refrigerator of claim 5, wherein:

the hinge is a multi joint hinge, and the fixing bracket is connected to the door through a portion which is adjacent to the door of the multi-joint hinge.

7. The refrigerator of claim 5, wherein the fixing bracket includes a wire guide that guides the wire drawn from the sliding member to a wire connection terminal which is adjacent to the door.

8. The refrigerator of claim 7, wherein the wire guide includes:

a pair of protruding pieces configured to be disposed to face each other; and at least two or more fixing protrusions configured to hold the wire disposed between the pair of protruding pieces.

9. The refrigerator of claim 4, wherein the sliding member is formed of a soft material.

10. The refrigerator of claim 4, wherein the case includes:

a storing portion configured to store the wire; and a drawing portion configured to guide the sliding member when drawn.

11. The refrigerator of claim 10, wherein:

the storing portion includes a plurality of protruding members, and the wire is disposed above and below the plurality of protruding members in a zigzag shape.

12. The refrigerator of claim 4, wherein:

the insertion end is hooked to a top surface of the body, and a portion of a side surface of the wire cover unit is screwed to the body.

13. The refrigerator of claim 12, wherein:

the body includes a coupling hole positioned in the top surface, and the insertion end includes an inserting protrusion corresponding to a shape of the coupling hole, and the inserting protrusion and the coupling hole are hooked to each other.

14. The refrigerator of claim 12, wherein the body is screwed to the wire cover unit in an outward direction from a center of the body.

15. The refrigerator of claim 12, wherein:

the body includes a body screw groove protruding from the body, the wire cover unit further includes a cover screw groove in a side surface of the wire cover unit corresponding to the body screw groove, and a screw is fastened to the body screw groove and the cover screw groove.

16. The refrigerator of claim 12, wherein the wire cover unit further includes a plurality of protruding portions which are linearly in contact with a portion which is in contact with the wire in a length direction of the wire.

17. A refrigerator comprising:

a body;

a door configured to open and close an inside of the body;

a multi-joint hinge configured to connect the body with the door;

a case mounted to a surface of the body and configured to store a wire drawn from the body in a space defined between the case and a top surface of the body, the case comprising an insertion end insertably hook-coupled with the body; and a sliding member configured to dispose a wire therein, be disposed to slide from an inside of the case to an outside of the case, and be hingeably connected with the door.

18. The refrigerator of claim 17, wherein:

the insertion end of the case is hook-coupled to the top surface of the body, and a portion of a side surface of the case is screwed to the body.

19. The refrigerator of claim 18, wherein:

the body includes a coupling hole positioned in the top surface, and the insertion end includes an inserting protrusion corresponding to a shape of the coupling hole, and the inserting protrusion and the coupling hole are hooked to each other.

20. The refrigerator of claim 18, wherein:

the body includes a body screw groove protruding from the body, the case includes a case screw groove in a side surface of the case corresponding to the body screw groove, and a screw is fastened to the body screw groove and the case screw groove.

* * * * *